US011296807B2

(12) United States Patent
Webb et al.

(10) Patent No.: US 11,296,807 B2
(45) Date of Patent: Apr. 5, 2022

(54) TECHNIQUES TO OPERATE A TIME DIVISION MULTIPLEXING(TDM) MEDIA ACCESS CONTROL (MAC)

(71) Applicant: Intel Corporation, Santa Clara, CA (US)

(72) Inventors: Matthew James Webb, Woodland Hills, CA (US); Daniel Christian Biederman, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 16/452,090

(22) Filed: Jun. 25, 2019

(65) Prior Publication Data

US 2019/0319730 A1    Oct. 17, 2019

(51) Int. Cl.
*H04W 76/12* (2018.01)
*H04J 3/16* (2006.01)

(52) U.S. Cl.
CPC ..................... *H04J 3/16* (2013.01)

(58) Field of Classification Search
CPC ........ H04J 3/16; H04L 12/4633; H04L 45/74; H04L 49/102; H04L 12/40169
See application file for complete search history.

(56) References Cited

U.S. PATENT DOCUMENTS

2018/0167702 A1* 6/2018 Lea .................... H04Q 11/0005
2020/0196326 A1* 6/2020 Li ......................... H04L 1/1854

FOREIGN PATENT DOCUMENTS

WO    WO-2012060638 A2 *  5/2012   ............ H04J 11/005

OTHER PUBLICATIONS

English translation of WO-2012060638-A2 (Year: 2012).*

* cited by examiner

*Primary Examiner* — Wei Zhao
(74) *Attorney, Agent, or Firm* — Compass IP Law PC

(57) ABSTRACT

Techniques to operate a time division multiplexing (TDM) media access control (MAC) module include examples of facilitating use of shared resources allocated to ports of a network interface based on a time slot mechanism. The shared resources allocated to process packet data received or sent through the ports of the network interface.

29 Claims, 10 Drawing Sheets

800

```
OBTAIN TDM ALLOCATION INFORMATION THAT INDICATES A TIME PERIOD
FOR A REPEATING SEQUENCE OF TIME SLOTS FOR USE OF SHARED
RESOURCES TO PROCESS PACKET DATA RECEIVED OR SENT THROUGH
PORTS OF A NETWORK INTERFACE
802
```

```
DETECT SEPARATE PATTERNS ASSOCIATED WITH RECEIVING OR SENDING
DATA THROUGH RESPECTIVE PORTS OF THE NETWORK INTERFACE
804
```

```
VERIFY THAT THE SEPARATE PATTERNS REPEAT TO VALIDATE THE
SEPARATE PATTERNS
806
```

```
LOAD, FOR A FIRST PORT FROM AMONG THE PORTS, A FIRST VALIDATED
PATTERN TO A TDM STORAGE RESOURCE INCLUDED IN THE SHARED
RESOURCES, THE FIRST VALIDATED PATTERN TO FACILITATE PROCESSING
PACKET DATA RECEIVED OR SENT THROUGH THE FIRST PORT DURING A
FIRST TIME SLOT FROM AMONG THE REPEATING SEQUENCE OF TIME
SLOTS, THE FIRST TIME SLOT ALLOCATED TO THE FIRST PORT FOR USE OF
THE SHARED RESOURCES
808
```

*FIG. 8*

Storage Medium 900

Computer Executable Instructions for 800

FIG. 9

TECHNIQUES TO OPERATE A TIME DIVISION MULTIPLEXING(TDM) MEDIA ACCESS CONTROL (MAC)

TECHNICAL FIELD

Descriptions are generally related to configuring resources used by network ports coupled with a network interface having a MAC.

BACKGROUND

Bandwidth is the maximum rate of data transfer across a given link or path. For example, in a data or communication network scenario, through the use of link aggregation, a number of connections between a source and destination may be aggregated into a single interface so that the bandwidth of a link or path between the source and destination is the sum of the maximum rate of transfer across all of the connections.

Local Area Networks (LANs) and Metropolitan Area Networks (MANs) may use the Institute of Electrical and Electronics Engineers (IEEE) 802.3 (Ethernet) protocol and frame format for data communication. The Ethernet protocol uses a common media access control (MAC) sublayer of a data link layer in the Open Systems Interconnection model (OSI model). The OSI model is a conceptual model that partitions a communication system into abstraction layers. The MAC sublayer is responsible for transferring data to and from a physical layer and encapsulates frames received from upper layers (for example, frames received from a network layer in the OSI reference model) into frames appropriate for the transmission medium. Speed specific media independent interfaces (MIIs) provide an interface to the physical layer that encodes frames for transmission and decodes received frames with the modulation specified for the speed of operation, transmission medium and supported link length.

The interface between the MAC sublayer and the physical layer includes signals for framing and collision detection, and transmit and receive serial bit streams. A basic MAC frame has a minimum length of 64 bytes and a maximum length of 1518 bytes. The basic MAC frame includes destination address, source address, length/type field, MAC client data, pad (if required), and frame check sequence (FCS).

A maximum length of a normal, non-jumbo Ethernet frame is 1518 bytes which includes 14 bytes of Ethernet header, 1500 bytes of data and 4 bytes of FCS. The FCS is a cyclic redundancy check (CRC) over all fields in the Ethernet frame (except the FCS). Between each transmitted frame there are two bytes of interframe gap and 8 bytes of preamble. Thus, each maximum length Ethernet frame consumes 1538 bytes of the bandwidth.

A lane is a bundle of signals that constitutes a logical subset of a point-to-point interconnect. A copper based Gigabit (Gb) Ethernet Network (1000 BaseT) link uses four lanes over all four cable pairs for simultaneous transmission in both directions. The theoretical maximum bandwidth on a Gigabit Ethernet network is defined by a node being able to send 1 Gb (125 Mega Bytes (MB)) each second. Bandwidth of the transmission medium may be increased by transmitting serial data over multiple lanes.

Ethernet protocols are being designed to handle substantially larger bandwidths than 1 Gb per second. For example, bandwidths for transmission mediums of 50 gigabits (50 G), 100 G, 200 G or 400 G are described by IEEE standard, Carrier sense Multiple access with Collision Detection (CSMA/CD) Access Method and Physical Layer Specifications, Published in August 2018 (hereinafter "the IEEE 802.3-2018 specification").

Data is transmitted and received over the transmission medium in serial format by the physical layer. The data is received (e.g., through a network interface port coupled with the transmission medium) and transmitted by the MAC sublayer in parallel format, e.g., via a data bus. As the bandwidth of the transmission medium is increased, additional buffer memory or larger receive queues are needed to handle this discrepancy. If additional buffer memory or larger capacity receive queues are not desired, the MAC sublayer must process the received data faster which requires increasing a system clock frequency for processing elements supporting the MAC sublayer or increase the amount of data processed per clock cycle by increasing the width of the data bus. For example, the processing elements supporting the MAC sublayer may operate at 800 megahertz (MHz). For this example, the MAC sublayer could scale to process data at a rate of 1.6 terabit per second (Tb/sec) if the width of the data bus is 256 bytes. A goal for a MAC sublayer of a network interface that uses as minimal amount of receive queue capacity, in some examples, is being capable of processing data received at a rate at least equal to the transmission medium bandwidth via which a network interface port couples with the transmission medium.

BRIEF DESCRIPTION OF THE DRAWINGS

FIG. 8 illustrates an example logic flow.
FIG. 9 illustrates an example storage medium.

DETAILED DESCRIPTION

According to some examples, one or more network interface ports (e.g., ports for a NIC) coupled with a transmission medium may be designed to couple to transmission mediums having transmission medium bandwidths scaling from 1 Gb/s to 200 Gb/s. Typically, resources utilized by a MAC sublayer when processing data received via a network interface port are allocated on a per port basis. For example, registers, delay elements (e.g., flip-flops or latches), static random access memory (SRAM), etc., used to process data through a data bus may be allocated on a per port basis. As the upper ends of transmission medium bandwidths continue to scale to higher transmission medium bandwidths, a greater amount of these types of resources are needed to support each of the ports that are capable of scaling to the upper end of these transmission medium bandwidths when resources are allocated on a per port basis. In some cases, a MAC sublayer supporting multiple ports for a range of transmission medium bandwidths may become too large or costly to deploy in a low-to-high bandwidth scaling environment. Also, if some ports are coupled to a lower transmission medium bandwidth (e.g., 1 Gb/s), yet allocated resources based on processing data for a much higher transmission medium bandwidth (e.g., 200 Gb/s), then a substantial amount of those port allocated resources may not be utilized and/or are utilized inefficiently. It is with respect to these challenges that the examples described herein are needed.

Figure 1:
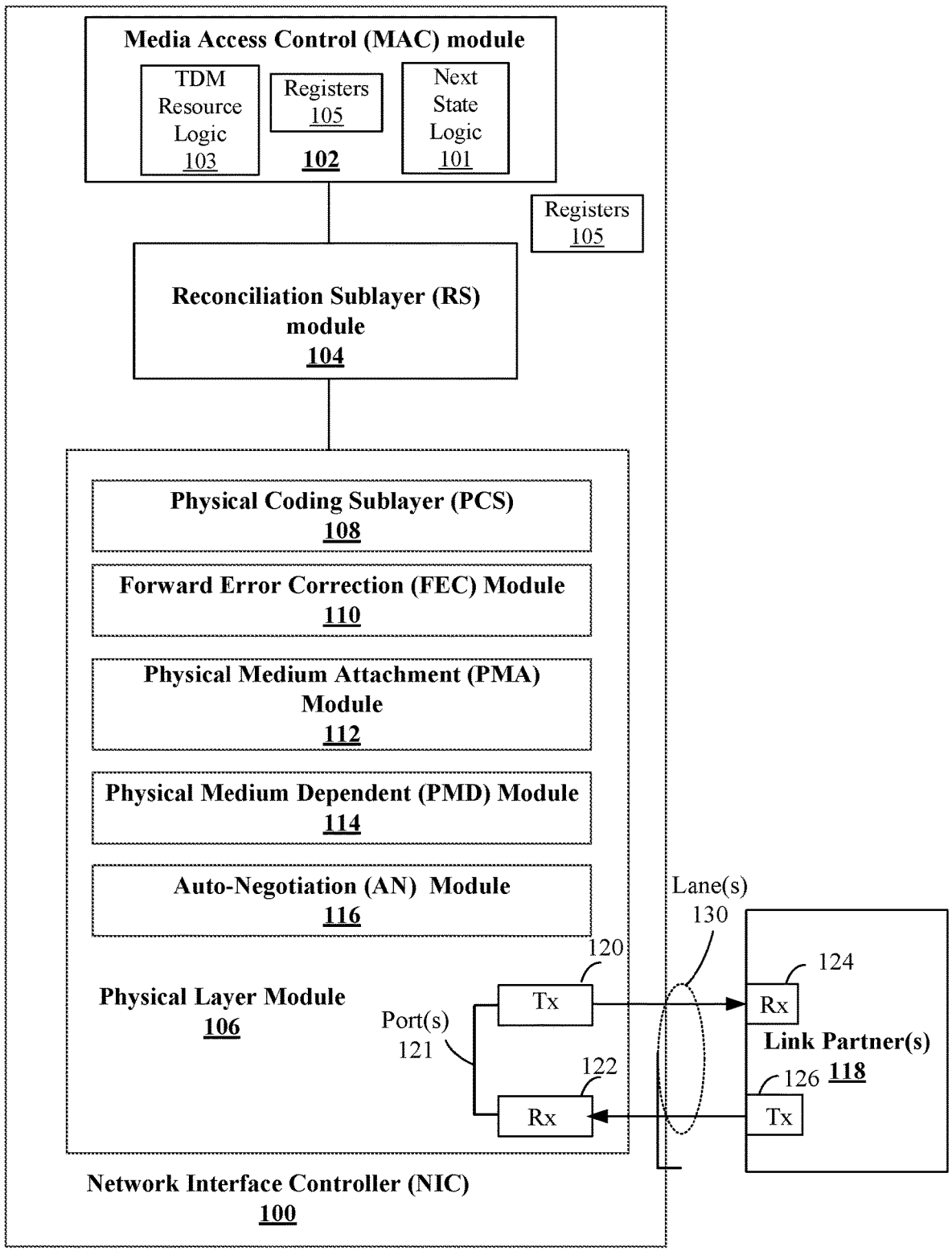
FIG. 1 illustrates an example network interface controller (NIC) module.

FIG. 1 illustrates an example NIC 100. In some examples, NIC 100 may represent a type of network interface and as shown in FIG. 1, NIC 100 may include Ethernet port logic and includes a media access control (MAC) module 102, a reconciliation sublayer (RS) module 104 and a physical layer module 106. The physical layer module 106 includes a physical medium dependent (PMD) module 114, a physical medium attachment (PMA) module 112, an auto-negotiation (AN) module 116, a forward error correction (FEC) module 110, a physical coding sublayer (PCS) module 108 and one or more port(s) 121. For these examples, each port from among port(s) 121 may separately include a transmitter port 120 including transmitter circuitry and a receive port 122 including receive circuitry. In some examples, one or more of the sublayer modules may be incorporated in, or otherwise form a portion of, another sublayer module. For example, part or all of the PMD module 114, PMA module 112, AN module 116, and/or FEC module 110 may be incorporated in PCS module 108.

According to some examples, each port from among port(s) 121 may be configured to operate as Ethernet ports coupled with one full-duplex communication lane from among respective one or more lane(s) 130. The respective one or more lane(s) 130 may include a twisted pair conductor, an optical fiber, or an electric backplane connection. For full-duplex operation, the respective one or more lane(s) 130 may separately include two twisted pair conductors, one pair for transmitting data and the other pair for receiving data from one or more link partner(s) 118.

In some examples, MAC module 102 is configured to implement aspects of the MAC layer operations and RS module 104 may be configured to implement reconciliation sublayer operations. For these examples, a link initialization of a lane from among lane(s) 130 communicatively coupling NIC 100 through a port among port(s) 121 to a link partner among link partner(s) 118 may occur. During the link initialization, AN module 116 may perform auto-negotiation of link speed and capabilities for the lane coupled to NIC 100 through the port.

According to some examples, PMD module 114 may located just above a medium dependent interface (MDI) (not shown). For these examples, PMD module 114 is responsible for interfacing to a transmission medium. Also, PMA module 112 may include functions for transmission, reception, collision detection, clock recovery and skew alignment. PMD module 114 and PMA module 112 may also be configured to transmit and receive serial binary data over a lane from among lane(s) 130 through a port from among port(s) 121 and to convert between serial binary data and parallel binary data. For example, PMD module 114 and PMA module 112 may receive serial binary data and convert the serial binary data to 32-bit parallel binary data. The serial to parallel binary data conversion may be performed by a serializer/de-serializer (SERDES) using, for example, a shift register. Serial binary data may be transmitted and received over the lane or multiple lanes at different frequencies.

In some examples, AN module 116 may be configured to auto-negotiate line transmission speed, mode of operation, and other communication parameters with a link partner from among link partner(s) 118 over a lane from among lane(s) 130. AN module 116 may be a state machine or other logic capable of implementing an auto-negotiation protocol. For example, AN module 116 may implement the auto-negotiation protocol specified by the IEEE 802.3 specification.

According to some examples, FEC module 110 may decode data passed from the PMD module 114 and PMA module 112 to the PCS module 108 and encode data passed from the PCS module 108 to the PMD module 114 and PMA module 112. The forward error correction code may improve the reliability of data transmission at higher line speeds.

In some examples, PCS module 108 is configured to decode parallel data received from PMD module 114 and PMA module 112 into decoded parallel data that may be processed by MAC module 102, and to encode parallel data received from MAC module 102 into encoded parallel data that may be transmitted by PMD module 114 and PMA module 112. Data transmitted over lane(s) 130 may be encoded, for example, to improve communication efficiency. For example, encoding the parallel data may add timing or synchronization symbols, align the data, add state transitions to the encoded data to improve clock recovery, or otherwise prepare the encoded data for serial transmission. PCS module 108 may be capable of encoding or decoding the parallel data using multiple line codes. For example, PCS module 108 may be capable of using a 64-bit/66-bit line code in which 64-bit blocks of data are encoded into 66-bit blocks of encoded data.

According to some examples, MAC module 102 may be configured to transfer data to and from physical layer module 106. RS module 104 may be configured to serve as a mapping function that reconciles signals at a media independent interface (MII). For example, according to MAC-physical signaling sublayer (PLS) service definitions.

In some examples, for a transmit direction, MAC module 102 receives data to be transmitted in a MAC frame over lane(s) 130, and generates the MAC frame that includes inter-packet gap (IPG), preamble, start of frame delimiter (SFD), padding, and cyclic redundancy check (CRC) bits in addition to the received data before passing the MAC frame to physical layer module 106 over a data bus. Physical layer module 106 encodes the MAC frame as required for reliable serial transmission over lane(s) 130 to link partner(s) 118.

According to some examples, in the receive direction, MAC module 102 receives MAC frames over a data bus from physical layer module 106. MAC module 102 accepts MAC frames from physical layer module 106, performs Ethernet frame detection and validation, CRC validation, updates statistics counters, strips out the CRC, preamble, and SFD, and forwards the rest of the MAC frame that includes headers for use by other, higher level protocols to a next layer (for example, the Internet protocol (IP) layer).

In some examples, as described in more detail below, logic and/or features of MAC module 102 may separately share resources to process packet data received or transmitted through individual port(s) 121 arranged to couple with, for example, a transmission medium having a 1 G, 50 G, a 100 G or a 200 G transmission medium bandwidth included in one or more lanes from among lane(s) 130. The resources may be shared based on a time-division multiplexing (TDM) architecture for MAC module 102. The shared resources may include TDM storage resources that may be arranged to facilitate packet processing by MAC module 102. TDM storage resources may include, but are not limited to, delay elements (e.g., flip-flops or latches), static random access memory (SRAM) or other types of memory structures to at least temporarily store data received by MAC module 102 via a data bus. The data associated with data packets received from or transmitted through port(s) 121.

According to some examples, the TDM architecture for MAC module 102 may include sharing resources on a per port basis based on a time slot mechanism. The time slot mechanism, for example, may allow for a more efficient way to share resources such as TDM storage resources in operating scenarios where NIC 100 may couple with a wide range of transmission medium bandwidths. Also, as described more below, logic and/or features of MAC module 102 such as TDM resource logic 103 may facilitate activation of TDM storage resources for port(s) 121 in order for these ports to use shared resources such as TDM storage resources. Also, as described more below, once TDM resource logic 103 has activated the TDM storage resources for port(s) 121, logic and/or features of MAC module 102 such as next state logic 101 may use the activated TDM storage resources to facilitate packet processing of packets received from or to be transmitted through port(s) 121.

In some examples, registers 105 may represent programmable data structures that may be used to adjust various TDM parameters associated with using or implementing a TDM architecture. Once programmed, registers 105 may indicate TDM allocation information. For example, registers 105 may be programmed to set or establish a time period for a repeating sequence of time slots, a size of individual time slots (e.g., several nanoseconds or microseconds) included in the time period, which ports are assigned to respective time slots, or identify TDM storage resources included in the shared resources for use during the respective time slots. Examples are not limited to these examples of how registers 105 may be programmed or set. As shown in FIG. 1, registers 105 may be part of MAC module 102 or may be located on NIC 100, separate from MAC module 102 but still accessible to logic and/or features of MAC module 102.

In some examples, logic and/or features of MAC module 102 such as TDM resource logic 103 or next state logic 101 may be implemented by logic encoded in one or more tangible media (e.g., embedded logic provided in an application specific integrated circuit (ASIC) or a field programmable gate array (FPGA)), digital signal processor (DCP) instructions, software (potentially inclusive or object code and source code) to be executed by a processor/processor circuit, or other similar machine, etc.), which may be inclusive of non-transitory computer-readable media/medium or machine-readable medium/medium. In some of these instances, memory elements located at or accessible to NIC 100 (not shown) may store data used for operations implemented by the logic and/or features of MAC module 102 such as TDM resource logic 103 or next state logic 101. This includes the memory elements being able to store software, logic, code or processor instructions that are executed to carry out functions or activities described in this disclosure for the logic and/or features of MAC module 102.

According to some examples, the term "packet" or "data packet", as used herein, may refer to a unit of data that may be routed between a source (e.g., link partner(s) 118) and a destination (e.g., a computing platform coupled with NIC 100) on a packet switched network. For these examples, a packet includes a source network address and a destination network address. These network addresses can by IP addresses in a transmission control protocol (TCP)/IP messaging protocol. The term "data", as used herein, may refer to any type of binary, numeric, voice, video, textual, or script data, or any type of source or object code, or any other suitable information in any appropriate format that may be communicated from one point to another in a system, electronic devices and/or networks. Additionally, messages, requests, responses, and queries are forms of network traffic, and may include packets, frames, signals, data, etc.

According to some examples, NIC 100 may be hosted by or coupled with a server. The server may be a server for a base transceiver station (BTS), a web server, a network server, an Internet server, a work station. In other examples, NIC 100 may be hosted by or coupled with a mini-computer, a main frame computer, a supercomputer, a network appliance, a web appliance, a distributed computing system, multiprocessor systems, processor-based systems, or combination thereof Also, although item 100, in shown in FIG. 1 as a NIC, a network interface may be another type of circuitry or device having physical layer ports arranged to couple with, for example, a transmission medium having a 1 G, 50 G, a 100 G or a 200 G transmission medium bandwidth included in one or more lanes from among lane(s) 130. For example, it could be circuitry of any device that has an Ethernet interface such as a processor, Ethernet switch ASIC, FPGA, graphic processing unit (GPU), general purpose GPU (GPGPU), etc.

Figure 2:
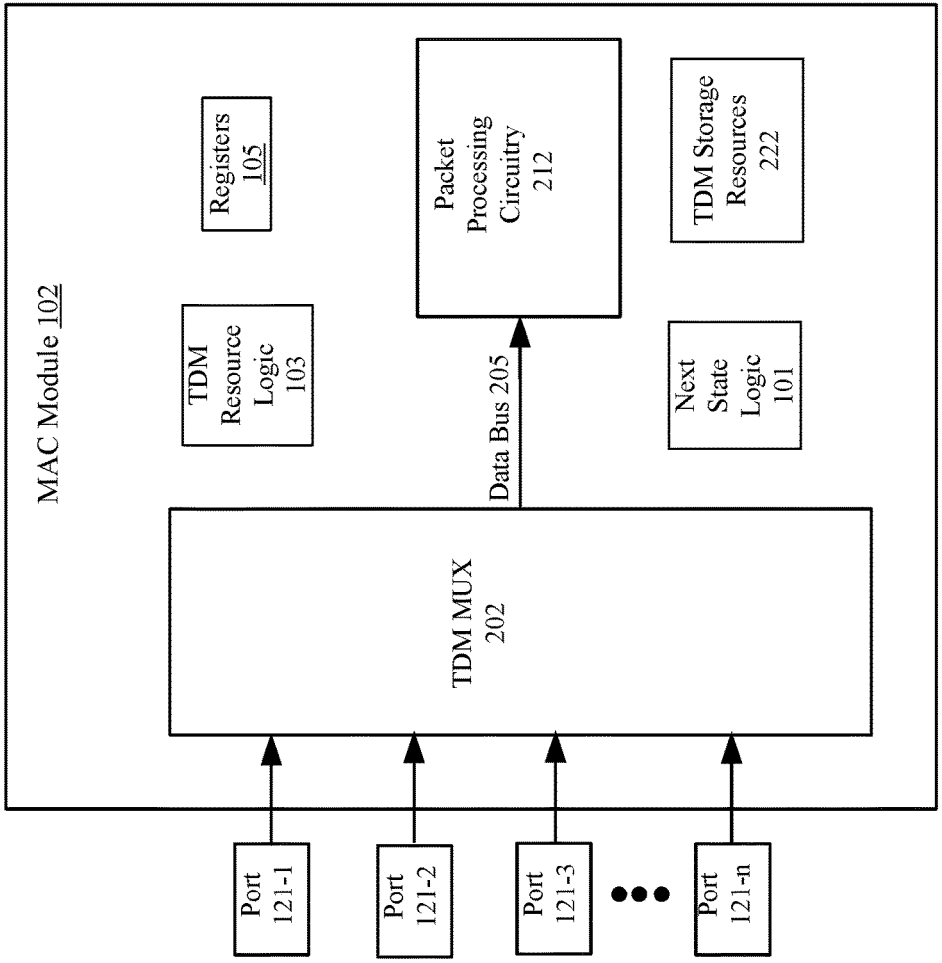
FIG. 2 illustrates an example system.

FIG. 2 illustrates an example system 200. According to some examples, system 200 illustrates an example of how functional elements of MAC module 102 implement a TDM architecture for sharing allocated resources on a per port basis. For these examples, as shown in FIG. 2, system 200 includes elements of NIC 100 such as port 121-1 to 121-n (where "n" represents any whole, positive integer >3), next state logic 101, TDM resource logic 103 and registers 105. FIG. 2 also depicts a TDM multiplexor (MUX) 202, a data bus 205, packet processing circuitry 212 and TDM storage resources 222. These additional elements, as described more below, illustrate examples of additional logic and/or features of MAC module 102 associated with implementing a TDM architecture.

According to some examples, registers 105 may be set or programmed to establish how TDM MUX 202 is to switch between ports 121-1 to 121-n based on a time slot mechanism. For example, over a repeating time period, port 121-1 may be given a first portion of time slots of the repeating time period, port 121-2 may be given a second portion of time slots, port 121-2 may be given a third portion of time slots, etc. Each port may then have access to data bus 205 and to shared TDM storage resources 222 during their respectively assigned portions of the repeating time period. TDM storage resources 222 may include, but are not limited to, delay elements (e.g., flip-flops or latches), SRAM, a combination of delay elements and SRAM or other types of memory structures to at least temporarily store data received by MAC module 102 and to be processed by packet processing circuitry 212. Also, packet processing circuitry 212 may process packet data for packets received through each port during their respectively assigned portions of the repeating time period and routed through data bus 205.

In some examples, data bus 205 may have a width that is based on attempting to scale to a data processing rate to match a bandwidth of a transmission medium routed through port(s) 121 without needed to increase an operating bandwidth of packet processing circuitry 212. For example, if a transmission medium routed through port(s) 121 had a bandwidth of 200 Gb/sec and packet processing circuitry 212 operated at 800 MHz, then a width of 32 bytes for data bus 205 would be needed. In another example, if packet processing circuitry 212 operated at 800 MHz and the transmission medium had a bandwidth of 1.6 Tb/sec, then a width of 256 bytes for data bus 205 would be needed. According to some examples, data bus 205 may be partitioned to be capable of processing multiple data packets or multiple chunks of one or more data packets per clock cycle. For example, a width of 256 bytes may be partitioned in four segments separately capable of sending either four packets of 64 bytes or four chunks of a packet that is larger than 256 bytes.

According to some examples, TDM resource logic 103 may implement a process to separately place into service a look ahead pattern to load to TDM storage resources 222 for each port from among ports 121-1 to 121-*n*. As described more below, placing a per port look ahead pattern in service may include learning and verifying/validating a look ahead pattern while implementing a TDM architecture. Also, as described more below, next state logic 101 may use verified/valid look ahead patterns that are loaded to TDM storage resources 222 to process packet data received or sent through ports 121-1 to 121-*n*.

In some examples, packet processing circuitry 212 may include various commercially available processors, including without limitation an AMD® Epyc®, Ryzen®, Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon® or Xeon Phi® processors; and similar processors. According to some examples, packet processing circuitry 212 may also include an application specific integrated circuit (ASIC) and at least some elements, logic and/or features of packet processing circuitry 212 may be implemented as hardware elements of an ASIC. According to some examples, packet processing circuitry 212 may also include an FPGA and at least some elements, logic and/or features of packet processing circuitry 212 may be implemented as hardware elements of the FPGA.

Figure 3:
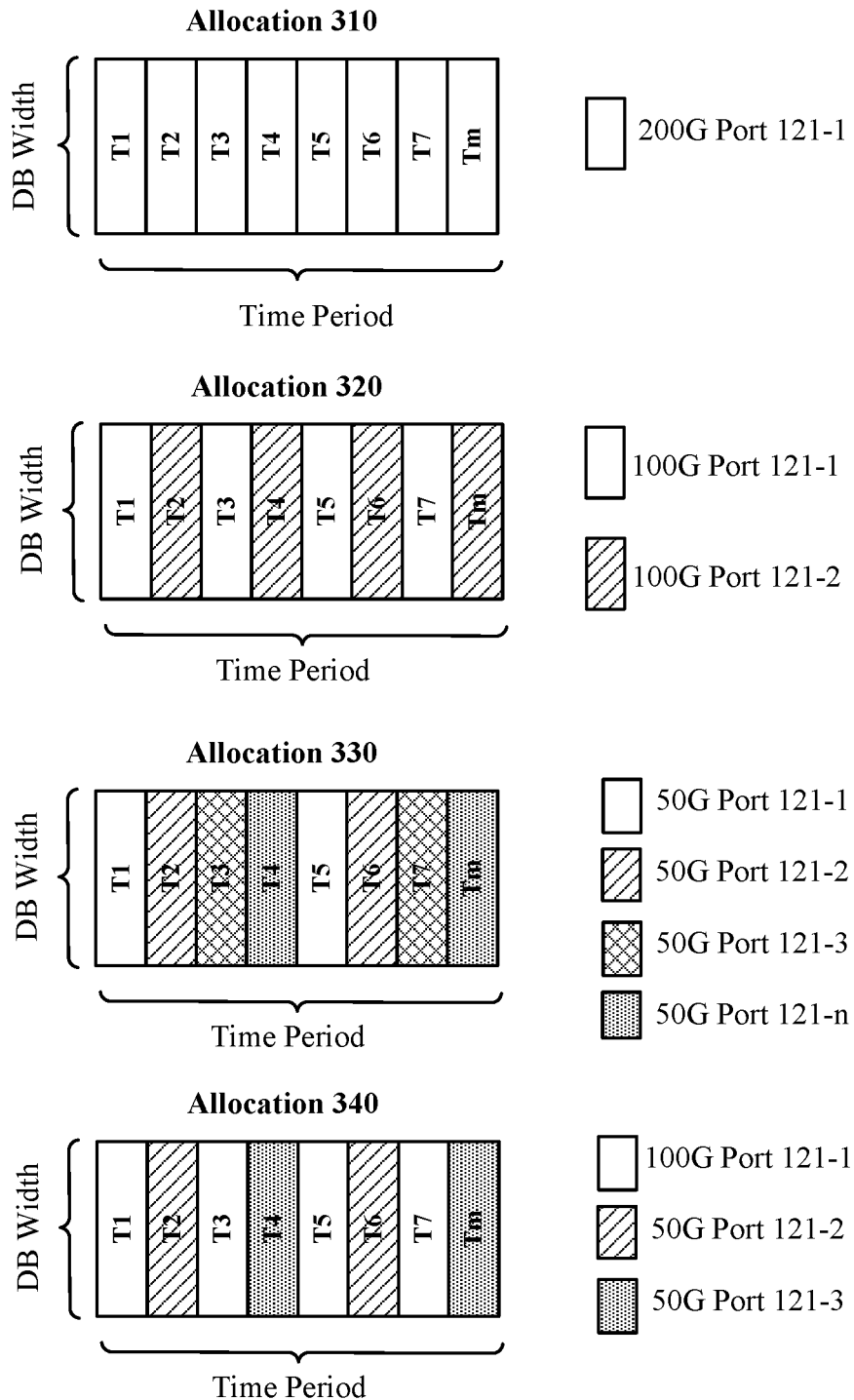
FIG. 3 illustrates example time division multiplexing (TDM) allocations.

FIG. 3 illustrates example TDM allocations 300. In some examples, as shown in FIG. 3, TDM allocations 300 include allocations 310, 320, 330 and 340. For these examples, allocations 300 provide examples of how time slots may be allocated to one or more ports from among ports 121-1 to 121-*n*. As shown in FIG. 3, a time period may be partitioned into time slots T1 to Tm, where "m" is any whole, positive integer >7. Also, a height of each time slot may be representative of a data bus (DB) width. For simplicity purposes, individual time slots may be of an equal width or portion of the time period and the DB width may be a same DB width for the allocations shown in FIG. 3. In other examples, individual time slots and/or DB widths may be of various different dimensions to reflect possible differences in ports assigned to respective time slots and/or to reflect data stream or data packet characteristics of data routed through these ports.

According to some examples, allocation 310 shows an example of allocating all time slots to port 121-1. For these example, port 121-1 may be coupled to a transmission medium having a data bandwidth of 200 Gb/sec and thus is identified as a 200 G port. Allocation 310 may indicate an example of when only a single port is active or coupled with a transmission medium.

In some examples, allocation 320 shows an example of allocating time slots between ports 121-1 and port 121-2. For these examples, these ports may couple to separate transmission mediums have data bandwidths of 100 Gb/sec and thus are identified as 100 G ports. As shown in FIG. 3, ports 121-1 and 121-2 are separately allocated ½ of the time slots on an alternating basis. The alternating basis may minimize packet processing latencies for processing packets routed through these ports.

According to some examples, allocation 330 shows an example of allocating time slots between ports 121-1, 121-2, 121-3 and 121-*n*. For these examples, these ports may couple to separate transmission mediums have data bandwidths of 50 Gb/sec and thus are identified as 50 G ports. As shown in FIG. 3, ports 121-1, 121-2, 121-3 and 121-*n* are separately allocated ¼ of the time slots on an alternating base.

In some examples, allocation 340 shows an example of allocating time slots between ports 121-1, 121-2 and 121-3. For these examples, port 121-1 may be a 100 G port and ports 121-2 and 121-3 may be 50 G ports. As shown in FIG. 3, port 121-1 may be allocated ½ of the time slots. Meanwhile, ports 121-2 and 121-3 are separately allocated ¼ of the time slots. Port 121-1 may have alternating time slots from among all time slots. Ports 121-2 and 121-3 may have alternating time slots from among the ½ of time slots not allocated to port 121-1.

Figure 4:
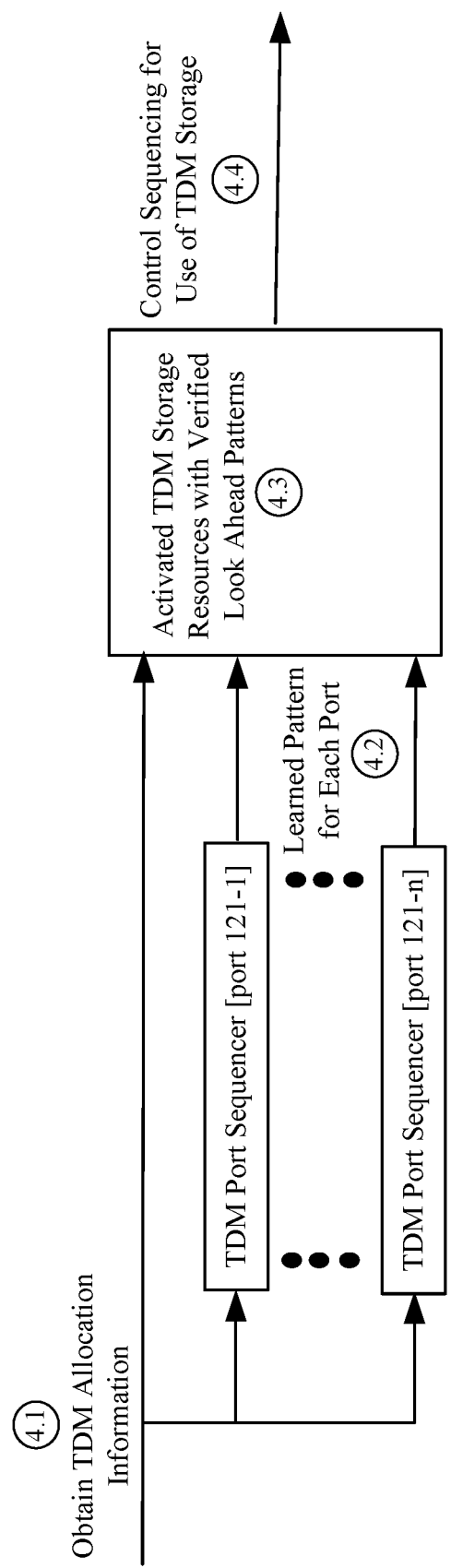
FIG. 4 illustrates an example first process.

FIG. 4 illustrates an example process 400. In some examples, process 400 may depict how logic and/or features of a MAC for a NIC may facilitate use of TDM storage resources. The TDM storage resources may be shared by one or more ports of the NIC based on a time slot mechanism that allocates time slots to the one or more ports. For these examples, process 400 may include use of various elements shown in FIG. 1 such as NIC 100, MAC module 102, TDM resource logic 103 or registers 105. Process 400 may also include use of various elements shown in FIG. 2 such as ports 121-1 to 121-*n*, TDM MUX 202, data bus 205, packet processing circuitry 212 or TDM storage resources 222. Examples are not limited to these elements shown in FIG. 1 or 2.

Beginning at process 4.1 (Obtain TDM Allocation Information), logic and/or features of MAC module 102 such as TDM resource logic 103 may obtain TDM allocation information. In some examples, the TDM allocation information may be obtained from registers 105. For these examples, the TDM allocation information may indicate a time period for a repeating sequence of time slots, a size (e.g., what portion of the time period) of individual time slots included in the time period and which ports from among ports 121-1 to 121-*n* are assigned to respective time slots. According to some examples, the TDM allocation information may match allocation 330 shown in FIG. 3 that has ports 121-1 to 121-*n* arranged as 50 G ports.

Moving to process 4.2 (Learn Pattern for Each Port), logic and/or features of MAC module 102 such as TDM resource logic 103 may implement a TDM port sequencer process to learn and verify look ahead patterns or sequences for ports 121-1 to 121-*n* while respective ports have access to shared resources based on the TDM allocation information. For example, a repeating pattern indicating a count of how may chunks of data may be received from a port via data bus 205 for processing by packet processing circuitry 212 during allocated time slots before an end of a data packet is reached. The per port TDM port sequencer process to learn and verify a repeating pattern for each port to place verified repeating patterns in service is described more below in a separate process.

Moving to process 4.3 (Activated TDM Storage Resources with Verified Look Ahead Patterns), logic and/or features of MAC module 102 such as TDM resource logic 103 may compile information to indicate activated TDM storage resources with verified/valid look ahead patterns for ports 121-1 to 121-*n*. The verified/valid look ahead patterns for ports 121-2 to 121-*n* may take several repeating TDM cycles to complete. For example, several time periods for allocation 300 may be completed before at least some ports from among ports 121-1 to 121-n have verified look ahead patterns to place in service. Ports not having verified look ahead patterns will have inactive TDM storage resources during their respective time slot allocations due to not having look ahead patterns that have been placed in service.

Moving to process 4.4 (Control Sequencing to Use of TDM Storage), logic and/or features of MAC module 102 such as TDM resource logic 103 may provide control sequencing information to load valid look ahead patterns to activated TDM storage resources. As described more below, the control sequencing may enable a verified/valid look ahead pattern to be loaded to TDM storage resources just prior to or as a port's respective time slot allocation arrives.

Figure 5:
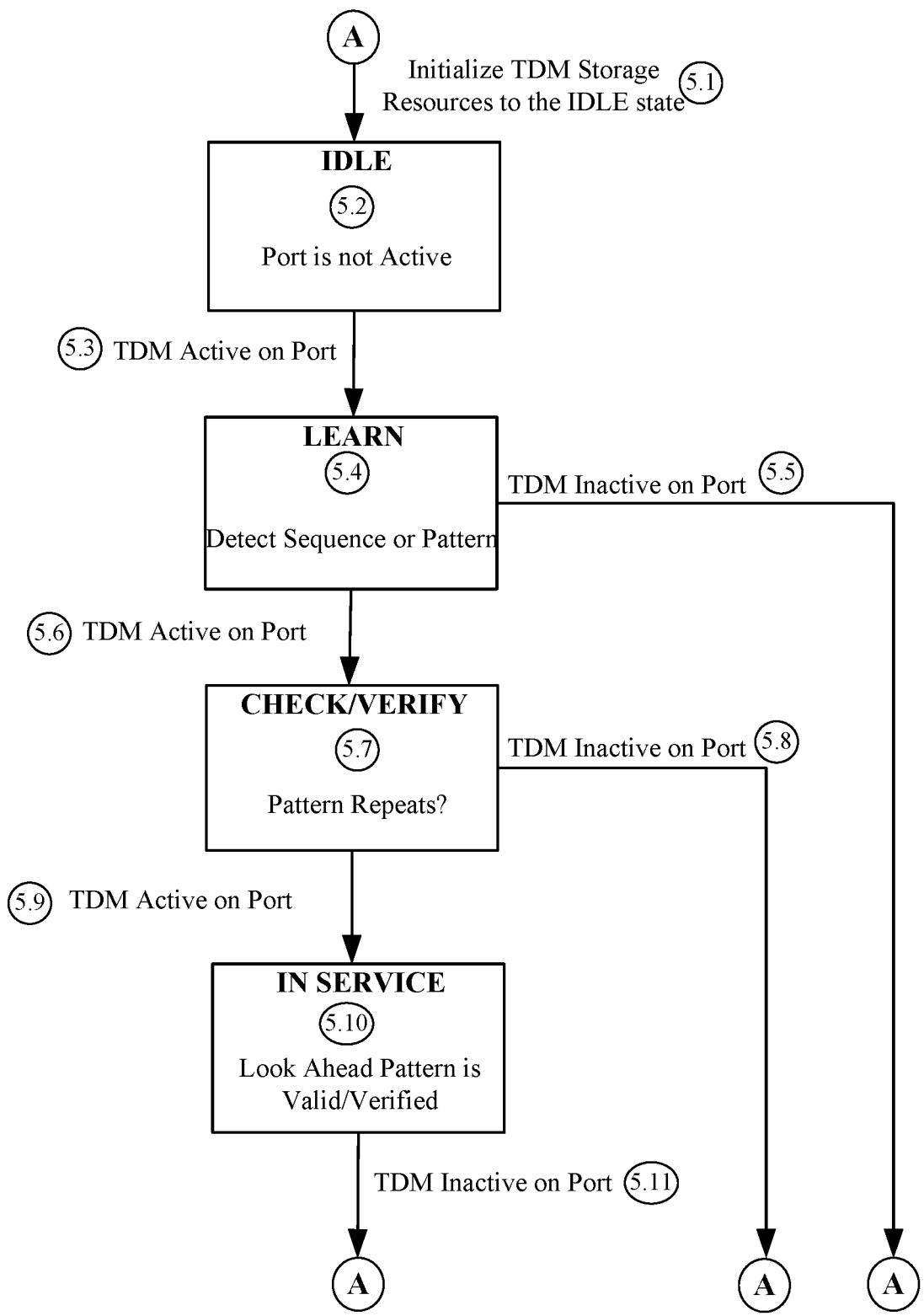
FIG. 5 illustrates an example second process.

FIG. 5 illustrates an example process 500. In some examples, process 500 may depict how logic and/or features of a MAC for a NIC such as TDM resource logic 103 may implement a TDM port sequencer process to learn a look ahead pattern for a port while the port has access to shared storage resources based on TDM allocation information. For these examples, process 500 may include use of various elements shown in FIG. 1 such as NIC 100, MAC module 102, TDM resource logic 103 or registers 105. Process 500 may also include use of various elements shown in FIG. 2 such as ports 121-1 to 121-n, data bus 205, packet processing circuitry 212 or TDM storage resources 222. Examples are not limited to these elements shown in FIG. 1 or 2.

Beginning at process 5.1 (Initialize TDM Storage Resources to the IDLE State), logic and/or features of MAC module 102 such a TDM resource logic 103 causes unallocated TDM storage resources from among TDM storage resources 222 to move from inactive state to an IDLE state for a port from among ports 121-1 to 121-n such as port 121-1. In some examples, an IDLE state may result from identifying what amount of TDM storage is needed for port 121-1, allocating that amount of TDM storage to port 121-1 and establishing timing for access to the TDM storage for temporarily storing data associated with receiving or sending data through port 121-1. The timing, for example, may be based on TDM allocation information obtained by TDM resource logic 103 as mentioned above for process 400. According to some examples, the TDM allocation information may match allocation 330 shown in FIG. 3 that has ports 121-1 to 121-n arranged as 50 G ports.

Moving to process 5.2 (Port is not Active), TDM resource logic 103 maintains the initialized TDM storage resources in the IDLE state while waiting for port 121-1 to become active. According to some examples, port 121-1 remains inactive while ports 121-2 to 121-n utilize their respective allocated timing slots according to allocation 330.

Moving to process 5.3 (TDM Active on Port), port 121-1's allocated timing slot has arrived and TDM is now active on port 121-1 (e.g., according to allocation 330). In some examples, TDM resource logic 103 may cause the allocated TDM storage resources to move from the IDLE state to an active state responsive to arrival of the port 121-1's allocated timing slot.

Moving to process 5.4 (Detect Sequence or Pattern), TDM resource logic 103 may detect a sequence or pattern associated with receiving or sending data through port 121-1 in order to learn the sequence or pattern. For example, a count of chunks of data that are sent to packet processing circuitry 212 before a tail or end of a packet is detected for each packet sent or received through port 121-1 during its allocated timing slot. A detected sequence or pattern of counts for packets sent or received through port 121-1 may serve as a look ahead pattern to be loaded to activated TDM resources during each of port 121-1's allocated timing slots to facilitate a determination of when a tail or end of a packet is expected. Another type of detected sequence or pattern may include a detected sequence of a repeated slot pattern. For example, 0,2,0,2,0 . . . or 0,1,2,3,0,1,2,3,0 . . .

Moving to process 5.5 (TDM Inactive on Port), TDM resource logic 103 may be unable to detect and learn a sequence or pattern for packets received or sent through port 121-1. In some examples, due to lack of detection of a sequence or pattern, TDM resource logic 103 does not place a pattern or sequence in service and may cause the TDM storage resources to move back to an inactive state for port 121-1. Causing the TDM storage resources to be inactive may result in the TDM storage resources becoming at least temporarily unallocated for port 121-1.

Moving to process 5.6 (TDM Active on Port), the port 121-1's allocated timing slot is occurring and hence TDM is active for port 121-1.

Moving to process 5.7 (Pattern Repeats?), TDM resource logic 103 may determine whether the learned sequence or pattern repeats to check/verify the learned sequence or pattern. In some examples, TDM resource logic 103 may check/verify the learned sequence or pattern over multiple allocated time slots for port 121-1.

Moving to process 5.8 (TDM Inactive on Port), TDM resource logic 103 may be unable to verify the learned sequence or pattern. In some examples, due to lack of verification of a sequence or pattern, TDM resource logic 103 does not place the learned sequence or pattern in service and may then cause the TDM storage resources to move back to an inactive state for port 121-1.

Moving to process 5.9 (TDM Active on Port), port 121-1's allocated timing slot is occurring and hence TDM is active for port 121-1.

Moving to process 5.10 (Look Ahead Pattern is Valid/Verified), TDM resource logic 103 may verify that the learned sequence or pattern repeats. In some examples, TDM resource logic 103 indicating that the learned sequence or pattern is valid or verified causes the learned sequence or pattern to be placed in service for port 121-1. For these examples, the TDM storage resources for port 121-1 remain active.

Moving to process 5.11 (TDM Inactive on Port), following verification/validity of the learned sequence or pattern and the ending of port 121-1's allocated timing slot, TDM resource logic 103 may cause the TDM storage resources to move back to an inactive state for port 121-1. According to some examples, the verified/valid learned sequence or pattern may be deemed as a valid look ahead pattern that may be loaded to TDM storage resources 222 just prior to an allocated timing slot for port 121-1. In some examples, if one or more lanes of lane(s) 130 coupled with port 121-1 is removed or goes down (e.g., Ethernet cable is removed) this may also cause the TDM to become inactive on port 121-1 until the one or more lanes are reestablished/reconnected.

According to some examples, TDM resource logic 103 may place verified look ahead patterns in service for ports 121-2 to 121-n following process 500 as described for port 121-1.

Figure 6:
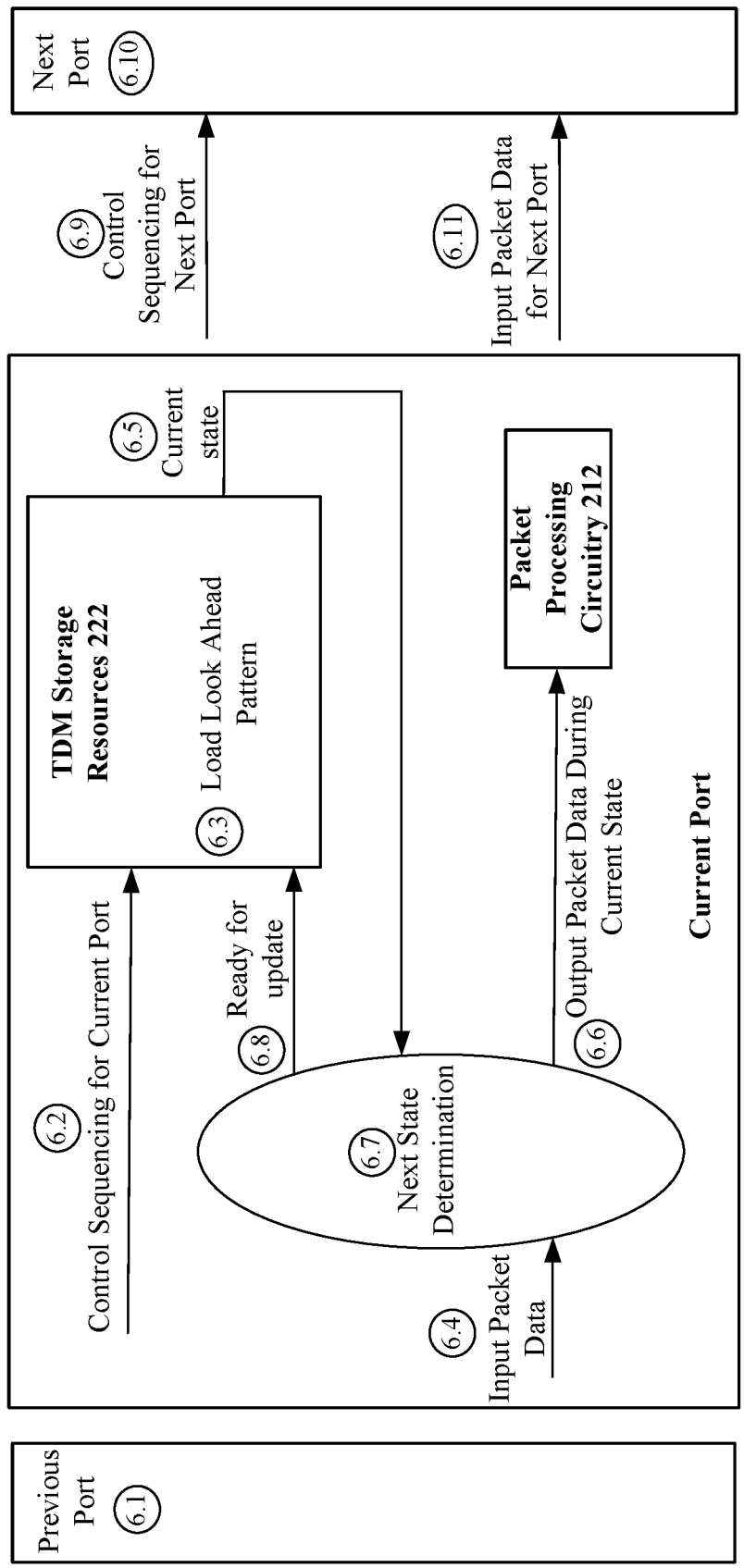
FIG. 6 illustrates example third process.

FIG. 6 illustrates an example process 600. In some examples, process 600 may depict how logic and/or features of a MAC for a NIC may use a verified/valid look ahead pattern that has been placed in service for loading to TDM storage resources to facilitate processing packet data. For these examples, process 600 may include use of various elements shown in FIG. 1 such as NIC 100, MAC module 102, next state logic 101 or TDM resource logic 103.

Process 600 may also include use of various elements shown in FIG. 2 such as ports 121-1 to 121-*n*, TDM MUX 202, data bus 205, packet processing circuitry 212 or TDM storage resources 222. Examples are not limited to these elements shown in FIG. 1 or 2.

Beginning at process 6.1 (Previous Port), a previous port indicates that an allocated time slot for a previous port has expired or is about to expire. For example, a time slot allocated to port 121-1 (e.g., according to allocation 330) has expired or is about to expire.

Moving to process 6.2 (Control Sequencing for Current Port), logic and/or features of MAC module 102 such as TDM resource logic 103 may cause a control sequencing for a port having a current allocated time slot to be sent to TDM storage resources 222. In some examples, the current port may be port 121-2 and the control sequencing for port 121-2 may include information to load a verified or valid look ahead pattern to TDM storage resources 222.

Moving to process 6.3 (Load Look Ahead Pattern), the verified/valid look ahead pattern is loaded in to TDM storage resources allocated from TDM storage resources 222 based on the information included in the control sequencing.

Moving to process 6.4 (Input Packet Data), input packet data for the current port may be received through the current port.

Moving to process 6.5 (Current State), a current state of the look ahead pattern is output from TDM storage resources 222. In some examples, the current state indicates how much of the look ahead pattern has been completed according to the control sequencing received from TDM resource logic 103. For example, the current state may be a counter or sequence of numbers such as 0, 1, 2, 3, 0, 1, 2, 3 . . . for a 4 port TDM or 0, 2, 0, 2 . . . for a 2 port TDM.

Moving to process 6.6 (Output Packet Data During Current State), logic and/or features of MAC module 102 such as next state logic 101 may cause packet data received through port 121-2 to be output (e.g., via data bus 205) for processing by packet processing circuitry 212 during the current state.

Moving to process 6.7 (Next State Determination), logic and/or features of MAC module 102 such as next state logic 101 may monitor the current state output from TDM storage resources 222 and determine that when the look ahead pattern has been completed, a next state is determined. In some examples, the next state determination triggers a need to prepare TDM storage resources 222 for a next port (e.g., according to allocations 300). For example, the next port is port 212-3.

Moving to process 6.8 (Ready for Update), logic and/or features of MAC module 102 such as next state logic 101 may send a ready for update indication to TDM storage resources 222 based on a determination that the look ahead pattern loaded for port 212-2 has been completed and to indicate a need to prepare for loading another look ahead pattern for the next port.

Moving to process 6.9 (Control Sequencing for Next Port), logic and/or features of MAC module 102 such as TDM resource logic 103 may cause a control sequencing for the next port having a next allocated time slot to be sent to TDM storage resources 222 (e.g., according allocation 330).

Moving to process 6.10 (Next Port), as mentioned above, the next port may be port 212-2 (e.g., according to allocation 330).

Moving to process 6.11 (Input Packet Data for Next Port), input packet data for port 212-2 may start to be received. Process 600 then comes to an end.

Figure 7:
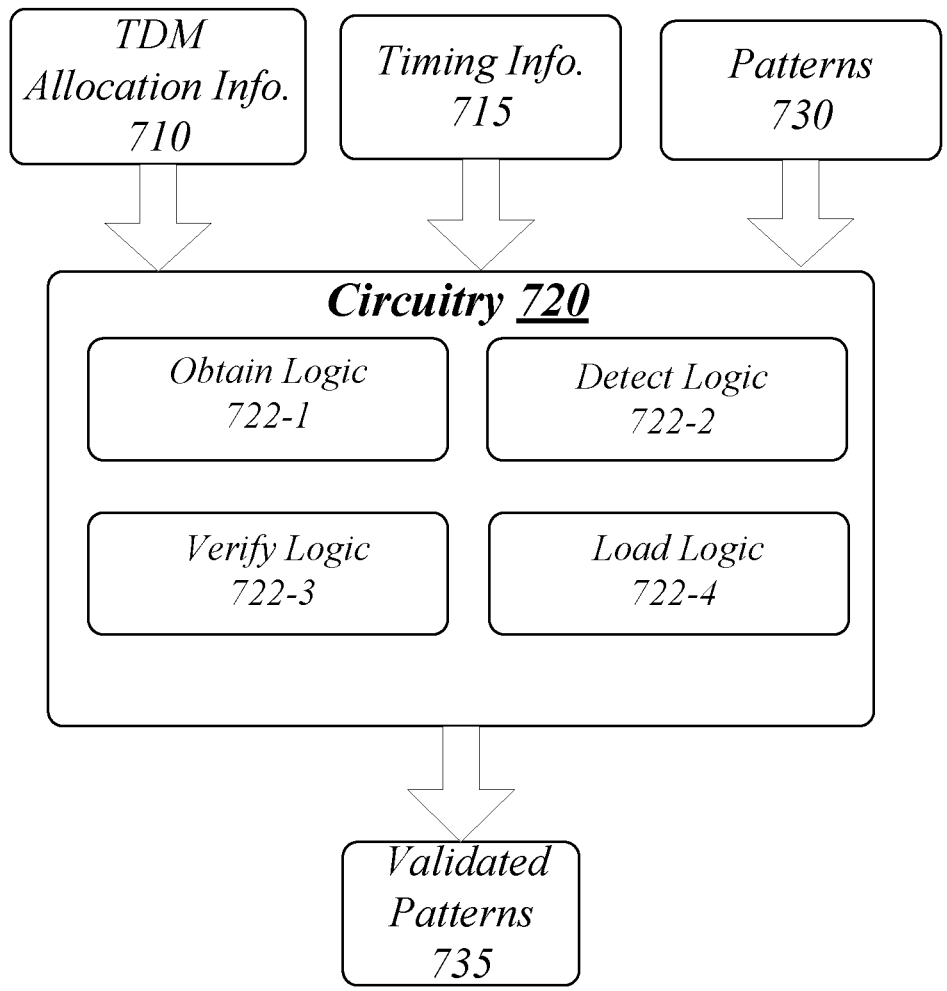
FIG. 7 illustrates an example apparatus.

FIG. 7 illustrates an example block diagram for apparatus 700. Although apparatus 700 shown in FIG. 7 has a limited number of elements in a certain topology, it may be appreciated that the apparatus 700 may include more or less elements in alternate topologies as desired for a given implementation.

According to some examples, apparatus 700 may be include in a MAC module for a network face and/or may be included in a NIC. Apparatus 700 may be supported by circuitry 720. For these examples, circuitry 720 may be at an ASIC, FPGA, configurable logic, processor, processor circuit, or CPU. For these examples, the ASIC, FPGA, configurable logic, processor, processor circuit, or CPU may support logic and/or features of a MAC module such as TDM resource logic 103 of MAC module 102 to facilitate use of shared resources allocated to ports of a network interface or a NIC based on a time slot mechanism for a TDM architecture. The shared resources allocated to process packet data received or sent through the ports of the network interface or NIC. Circuitry 720 may be arranged to execute one or more software or firmware implemented modules, components or logic 722-*a* (module, component or logic may be used interchangeably in this context). It is worthy to note that "a" and "b" and "c" and similar designators as used herein are intended to be variables representing any positive integer. Thus, for example, if an implementation sets a value for a=4, then a complete set of software or firmware for modules, components or logic 722-*a* may include logic 722-1, 722-2, 722-3 or 722-4. The examples presented are not limited in this context and the different variables used throughout may represent the same or different integer values. Also, "logic", "module" or "component" may also include software/firmware stored in computer-readable media, and although types of logic are shown in FIG. 7 as discrete boxes, this does not limit these types of logic to storage in distinct computer-readable media components (e.g., a separate memory, etc.).

According to some examples, as mentioned above, circuitry 720 may include an ASIC, an FPGA, a configurable logic, a processor, a processor circuit, a CPU, or one or more cores of a CPU. Circuitry 720 may be generally arranged to execute one or more software components 722-*a*. Circuitry 720 may be all or at least a part of any of various commercially available processors, including without limitation an AMD® Athlon®, Epyc®, Ryzen®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and; and similar processors.

According to some examples, apparatus 700 may include obtain logic 722-1. Obtain logic 722-1 may be executed or supported by circuitry 720 to obtain TDM allocation information 710 that indicates a time period for a repeating sequence of time slots separately allocated to ports of a network interface for use of shared resources to process packet data received or sent through the ports. For these examples, TDM allocation information 710 may be obtained from registers located on or accessible to the network interface.

In some examples, apparatus 700 may include a detect logic 722-2. Detect logic 722-2 may be executed or supported by circuitry 720 to cause a detection of separate patterns associated with receiving or sending data through respective ports of the network interface during time slots allocated to the respective ports. For these examples, detect logic 722-2 may use timing information 715 to determine the time of the time slots to detect patterns 730.

According to some examples, apparatus 700 may include verify logic 722-3. Verify logic 722-3 may be executed or supported by circuitry 720 to verify that the separate patterns repeat to validate the separate patterns.

In some examples, apparatus 700 may include a load logic 722-4. Load logic 722-4 may be executed or supported by circuitry 720 to cause, for a first port from among the ports, a first validated pattern to be loaded to a TDM storage resource included in the shared resources, the first validated pattern to facilitate processing packet data received or sent through the first port during a first time slot from among the repeating sequence of time slots, the first time slot allocated to the first port for use of the shared resources. For these examples, the first validated pattern to be loaded to the TDM storage resource may be included in validated pattern 735.

Various components of apparatus 700 and a MAC module, network interface or NIC via may include apparatus 700 may be a part of may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 8 illustrates an example logic flow 800. Logic flow 800 may be representative of some or all of the operations executed by one or more logic, features, or devices described herein, such as apparatus 700. More particularly, logic flow 800 may be implemented by at least obtain logic 722-1, detect logic 722-2, verify logic 722-3 or load logic 722-4.

According to some examples, logic flow 800 at block 802 may obtain TDM allocation information that indicates a time period for a repeating sequence of time slots for use of shared resources to process packet data received or sent through ports of a network interface. For these examples, obtain logic 722-1 may obtain the TDM allocation information.

In some examples, logic flow 800 at block 804 may detect separate patterns associated with receiving or sending data through respective ports of the network interface. For these examples, detect logic 722-2 may detect the separate patterns.

According to some examples, logic flow 800 at block 806 may verify that the separate patterns repeat to validate the separate patterns. For these examples, verify logic 722-3 may verify the separate patterns.

In some examples, logic flow 800 at block 808 may load, for a first port from among the ports, a first validated pattern to a TDM storage resource included in the shared resources, the first validated pattern to facilitate processing packet data received or sent through the first port during a first time slot from among the repeating sequence of time slots, the first time slot allocated to the first port for use of the shared resources. For these examples, load logic 722-4 may load the first validated pattern.

FIG. 9 illustrates an example storage medium 900. In some examples, storage medium 900 may be an article of manufacture. Storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
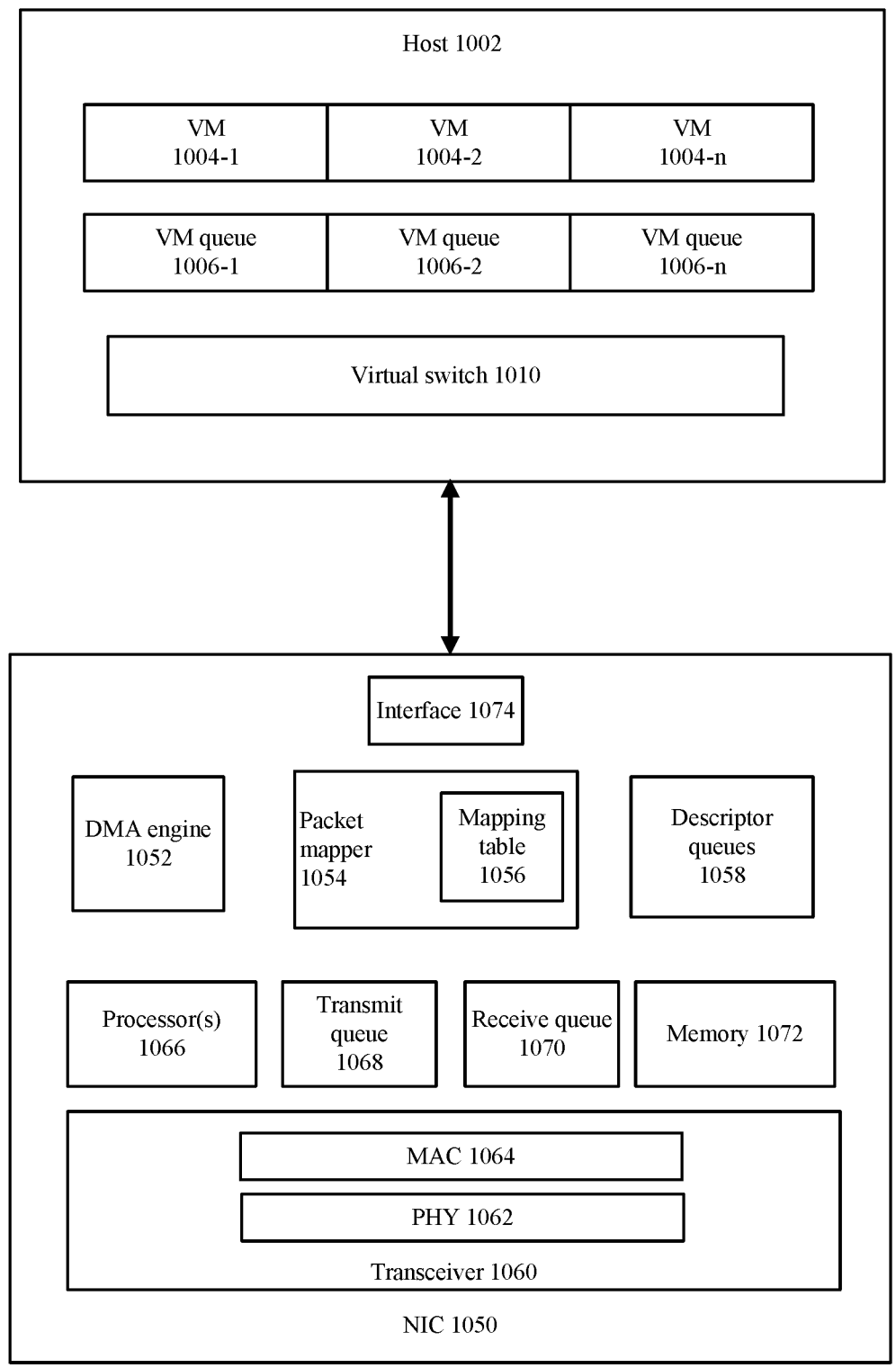
FIG. 10 illustrates an example second system.

FIG. 10 illustrates and example system 1000. In some examples, as shown in FIG. 10, system 1000 may include a host 1002. Host 1002 may be any computing platform with compute, interconnect, memory, storage, and network resources (not shown). For example, host 1002 may include one or more processors, interconnects, one or more memory, one or more storage devices, and one or more network interfaces. Host 1002 may support one or more virtual machines (VMs) 1004 to 1004-*n*. VMs 1004-1 to 1004-N may be any VM supported by host 1002. Also, VM queues 1006-1 to 1006-*n* may be associated with respective VMs 1004-1 to 1004-N and may be included in memory resources maintained by host 1002.

According to some examples, for a packet transmission, virtual switch 1010 may detect that a transmit packet and/or descriptor is formed in a VM queue and a virtual switch 1010 supported by host 1002 may request the packet header, payload, and/or descriptor be transferred to a NIC 1050 using a direct memory access (DMA) engine 1052 located at NIC 1050. For these examples, descriptor queues 1058 may receive the descriptor for the packet to be transmitted. NIC 1050 may transmit the packet. For example, a packet may have a header that identifies the source of the packet, a destination of the packet, and routing information of the packet. A variety of packet protocols may be used, including, but not limited to Ethernet, FibreChannel, Infiniband, or Omni-Path. Host 1002 may transfer a packet to be transmitted from a VM queue from among VM queues 1006-1 to 1006-*n* to NIC 1050 for transmission without use of an intermediate queue or buffer.

In some examples, a virtual switch 1010 supported by host 1002 may monitor properties of the transmitted packet header to determine if those properties are to be used to cause an update to a mapping table 1056 or add a mapping in mapping table 1056. According to some examples, to program a mapping table, a source IP address of a packet may be transmitted from VM 1004-1. For these examples, a mapping is created in mapping table 1056 between that source IP address and VM queue 1006-1 is assigned for that mapping. A packet received by NIC 1050 with a destination IP address equal to the value of the source IP address of VM 1004-1 is placed in mapped VM queue 1006-1. Also, for these examples, the source IP address is used to program the mapping, but it is the destination IP address that is an inspected characteristic or property of packets received on NIC 1050, to determine where to route these packets. Thereafter, a received packet having a property or properties that match the mapping rule is transferred from NIC 1050 to VM queue 1006-1 using DMA engine 1052. For example, if VM 1004-1 requests packet transmission from a source IP address of 2.2.2.2, and if no mapping rule for VM 1004-1 is in mapping table 1056, then virtual switch 1010 may add a mapping of a received packet with a destination IP address of 2.2.2.2 to VM queue 1006-1, which is associated with VM 1004-1.

Virtual switch 1010 may be any software and/or hardware device that provides one or more of: visibility into inter-VM communication; support for Link Aggregation Control Protocol (LACP) to control the bundling of several physical ports together to form a single logical channel; support for standard 802.1Q VLAN model with trunking; multicast snooping; IETF Auto-Attach SPBM and rudimentary required LLDP support; BFD and 802.1ag link monitoring; STP (IEEE 802.1D-1998) and RSTP (IEEE 802.1D-2004); fine-grained QoS control; support for HF SC qdisc; per VM interface traffic policing; network interface bonding with source-MAC load balancing, active backup, and L4 hashing; OpenFlow protocol support (including many extensions for virtualization), IPv6 support; support for multiple tunneling protocols (GRE, VXLAN, STT, and Geneve, with IPsec support); support for remote configuration protocol with C and Python bindings; support for kernel and user-space forwarding engine options; multi-table forwarding pipeline with flow-caching engine; and forwarding layer abstraction to ease porting to new software and hardware platforms. A non-limiting example of virtual switch 1010 is Open vSwitch (OVS), described at https://www.openvswitch.org/.

An orchestrator, cloud operating system, or hypervisor (not shown) may be used to program virtual switch 1010. For example, OpenStack, described at https://www.openstack.org/can be used as a cloud operating system. The orchestrator, cloud operating system, or hypervisor can be executed on or supported by host 1002 or may be executed on or supported by a different physical computing platform.

According to some examples, for a received packet, NIC 1050 may use packet mapper 1054 to route received packets and/or associated descriptors to a VM queue supported by host 1002. Descriptor queues 1058 may be used to store descriptors of received packets. Packet mapper 1054 may use mapping table 1056 to determine which characteristics of a received packet to use to map to a VM queue. A VM queue can be a region of memory maintained by host 1002 that is able to be accessed by a VM. Content maintained or stored in the VM queue may be accessed in first-received-first-retrieved manner or according to any order that a VM requests. For example, a source IP address of 2.2.2.2 specified in a header of a received packet can be associated with VM queue 1006-1 in mapping table 1056. Based on mapping in mapping table 1056, NIC 1050 may use DMA engine 1052 to copy a packet header, packet payload, and/or descriptor directly to VM queue 1006-1, instead of copying the packet to an intermediate queue or buffer.

In some examples, as shown in FIG. 10, NIC 1050 may also include a transceiver 1060, processor(s) 1066, a transmit queue 1068, a receive queue 1070, a memory 1072, and a bus interface 1074. Transceiver 1060 may be capable of receiving and transmitting packets in conformance with applicable protocols such as Ethernet as described in the IEEE 802.3 specification, although other protocols may be used. Transceiver 1060 may receive and transmit packets from and to a network via a network medium or link. Transceiver 1060 may include PHY circuitry 1062 and MAC circuitry 1064. PHY circuitry 1062 may include encoding and decoding circuitry (not shown) to encode and decode data packets. MAC circuitry 1064 can be configured to assemble data to be transmitted into packets, that include destination and source addresses along with network control information and error detection hash values. In some examples, MAC circuitry 1064 may implement a TDM architecture to allocated shared resources to process packet data to assemble data to be transmitted into packets (e.g., as described above for MAC module 102). Processor(s) 1066 can be any processor, core, graphics processing unit (GPU), or other programmable hardware device that facilitates programming of NIC 1050. For example, processor(s) 1066 may execute packet mapper 1054. Memory 1072 may be any type of volatile or non-volatile memory device and may at least temporarily store instructions used to program one or more elements of NIC 1050. In some examples, memory 1072 may also include programmable registers that may programmed to maintained TDM allocation information associated with MAC circuitry 1064 implementing a TDM architecture. Transmit queue 1068 may include data or references to data for transmission by NIC 1050. Receive queue 1070 may include data or references to data that was received by NIC 1050. Descriptor queues 1058 may reference data or packets in transmit queue 1068 or receive queue 1070. In some examples, descriptor queues 1058 that include transmit and receive queues 1068 and 1070 may be maintained in system memory for host 1002 rather than at NIC 1050. A bus interface 1074 may provide an interface with host 1002. For example, bus interface 1074 can be compatible with PCI, PCI Express, PCI-x, Serial ATA, and/or USB compatible interface (although other interconnection standards may be used).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

The follow examples pertain to additional examples of technologies disclosed herein.

EXAMPLE 1

An example apparatus may include circuitry to obtain TDM allocation information. The TDM allocation information may indicate a time period for a repeating sequence of time slots for use of shared resources to process packet data received or sent through ports of a network interface. The circuitry may also cause a detection of separate patterns associated with receiving or sending data through respective ports of the network interface. The circuitry may also verify that the separate patterns repeat to validate the separate patterns. The circuitry may also cause, for a first port from among the ports, a first validated pattern to be loaded to a TDM storage resource included in the shared resources. The first validated pattern may facilitate processing packet data received or sent through the first port during a first time slot from among the repeating sequence of time slots, the first time slot allocated to the first port for use of the shared resources.

EXAMPLE 2

The apparatus of example 1, the TDM allocation information may further indicate a size of individual time slots in relation to the time period for the repeating sequence of time slots, which ports from among the ports of the network interface are assigned to the individual time slots, or identify the TDM storage resource included in the shared resources.

EXAMPLE 3

The apparatus of example 1, the use of the shared resources to process packet data may include use of the shared resources to process packet data at a MAC module.

EXAMPLE 4

The apparatus of example 3, the first validated pattern may be a pattern that indicates a count of chunks of data that are processed at the MAC module for the packet data received or sent through the first port before a tail or end of packet is detected.

EXAMPLE 5

The apparatus of example 1, the TDM storage resource may be static random access memory (SRAM), a plurality of latches, or a combination of latches and SRAM.

EXAMPLE 6

The apparatus of example 1, the circuitry to may also cause, for a second port from among the ports, a second validated pattern to be loaded to the TDM storage resource. The second validated pattern may facilitate processing packet data received or sent through the second port during a second time slot from among the repeating sequence of time slots. The second time slot may be allocated to the second port for use of the shared resources. The circuitry may also cause, for a third port from among the ports, a third validated pattern to be loaded to the TDM storage resource. The third validated pattern may facilitate processing packet data received or sent through the third port during a third time slot from among the repeating sequence of time slots. The third time slot may be allocated to the third port for use of the shared resources.

EXAMPLE 7

The apparatus of example 6 may also include the first port capable of coupling with a first transmission medium having a first data bandwidth and the second and third ports capable of coupling with a second transmission medium having a second data bandwidth. The first data bandwidth may be two times greater than the second data bandwidth. The first port may be allocated a half of a total number of the repeating sequence of time slots. The second and third ports may be separately allocated a fourth of the total number of the repeating sequence of time slots.

EXAMPLE 8

The apparatus of example 1, the network interface may be a NIC.

EXAMPLE 9

The apparatus of example 1 may also include one or more registers. The circuitry may obtain the TDM allocation information from the one or more registers.

EXAMPLE 10

An example method may include obtaining TDM allocation information that indicates a time period for a repeating sequence of time slots for use of shared resources to process packet data received or sent through ports of a network interface. The method may also include detecting separate patterns associated with receiving or sending data through respective ports of the NIC. The method may also include verifying that the separate patterns repeat to validate the separate patterns. The method may also include loading, for a first port from among the ports, a first validated pattern to a TDM storage resource included in the shared resources. The first validated pattern may facilitate processing packet data received or sent through the first port during a first time slot from among the repeating sequence of time slots. The first time slot may be allocated to the first port for use of the shared resources.

EXAMPLE 11

The method of example 10, the network interface may be a NIC. The method may include obtaining the TDM allocation information from one or more registers located on the NIC.

EXAMPLE 12

The method of example 10, the TDM allocation information may also indicate a size of individual time slots in relation to the time period for the repeating sequence of time slots, which ports from among the ports of the network interface are assigned to the individual time slots, or identify the TDM storage resource included in the shared resources.

EXAMPLE 13

The method of example 10, the use of the shared resources to process packet data may include to use the shared resources to process packet data at a media access control (MAC) module for the network interface.

EXAMPLE 14

The method of example 13, the first validated pattern may be a pattern that indicates a count of chunks of data that are processed at the MAC module for the packet data received or sent through the first port before a tail or end of packet is detected.

EXAMPLE 15

The method of example 10, the TDM storage resource may be static random access memory (SRAM), a plurality of latches, or a combination of latches and SRAM.

EXAMPLE 16

The method of example 10 may also include loading, for a second port from among the ports, a second validated pattern to the TDM storage resource. The second validated pattern may facilitate processing packet data received or sent through the second port during a second time slot from among the repeating sequence of time slots. The second time slot may be allocated to the second port for use of the shared resources. The method may also include loading, for a third port from among the ports, a third validated pattern to the TDM storage resource. The third validated pattern may facilitate processing packet data received or sent through the third port during a third time slot from among the repeating sequence of time slots. The third time slot may be allocated to the third port for use of the shared resources.

EXAMPLE 17

The method of example 16 may also include the first port capable of coupling with a first transmission medium having a first data bandwidth and the second and third ports capable of coupling with a second transmission medium having a second data bandwidth. The first data bandwidth may be two times greater than the second data bandwidth. The first port may be allocated a half of a total number of the repeating sequence of time slots The second and third ports may be separately allocated a fourth of the total number of the repeating sequence of time slots.

EXAMPLE 18

At example least one machine readable medium may include a plurality of instructions that in response to being executed by a system cause the system to carry out a method according to any one of examples 10 to 17.

EXAMPLE 19

An example apparatus may include means for performing the methods of any one of examples 10 to 17.

EXAMPLE 20

An example at least one machine readable medium may include a plurality of instructions that in response to being executed by a system, cause the system to obtain TDM allocation information that indicates a time period for a repeating sequence of time slots for use of shared resources to process packet data received or sent through ports of a network interface. The instructions may also cause the system to detect separate patterns associated with receiving or sending data through respective ports of the network interface. The instructions may also cause the system to verify that the separate patterns repeat to validate the separate patterns. The instructions may also cause the system to load, for a first port from among the ports, a first validated pattern to a TDM storage resource included in the shared resources. The first validated pattern may facilitate processing packet data received or sent through the first port during a first time slot from among the repeating sequence of time slots, the first time slot allocated to the first port for use of the shared resources.

EXAMPLE 21

The at least one machine readable medium of example 20, the network interface may be a NIC. The instructions may also cause the system to obtain the TDM allocation information from one or more registers located on the NIC.

EXAMPLE 22

The at least one machine readable medium of example 20, the TDM allocation information may further indicate a size of individual time slots in relation to the time period for the repeating sequence of time slots, which ports from among the ports of the network interface are assigned to the individual time slots, or identify the TDM storage resource included in the shared resources.

EXAMPLE 23

The at least one machine readable medium of example 20, the use of the shared resources to process packet data may include to use of the shared resources to process packet data at a MAC module for the network interface.

EXAMPLE 24

The at least one machine readable medium of example 23, the first validated pattern may include a pattern that indicates a count of chunks of data that are processed at the MAC for the packet data received or sent through the first port before a tail or end of packet is detected.

EXAMPLE 25

The at least one machine readable medium of example 20, the TDM storage resource may be static random access memory (SRAM), a plurality of latches, or a combination of latches and SRAM.

EXAMPLE 26

The at least one machine readable medium of example 20, further including the instructions to cause the system to load, for a second port from among the ports, a second validated pattern to the TDM storage resource. The second validated pattern may facilitate processing packet data received or sent through the second port during a second time slot from among the repeating sequence of time slots. The second time slot may be allocated to the second port for use of the shared resources. The instructions may also cause the system to load, for a third port from among the ports, a third validated pattern to the TDM storage resource. The third validated pattern may facilitate processing packet data received or sent through the third port during a third time slot from among the repeating sequence of time slots. The third time slot may be allocated to the third port for use of the shared resources.

EXAMPLE 27

The at least one machine readable medium of example 26 may also include the first port being capable of coupling with a first transmission medium having a first data bandwidth and the second and third ports capable of coupling with a second transmission medium having a second data bandwidth. The first data bandwidth may be two times greater than the second data bandwidth. The first port may be allocated a half of a total number of the repeating sequence of time slots. The second and third ports may be separately allocated a fourth of the total number of the repeating sequence of time slots.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. An apparatus comprising:
   circuitry to:
   obtain time division multiplexing (TDM) allocation information, the TDM allocation information to indicate a time period for a repeating sequence of time slots for use of shared resources to process packet data received or sent through ports of a network interface;
   cause a detection of separate patterns associated with receiving or sending data through respective ports from among the ports of the network interface;

verify that the separate patterns repeat to validate the separate patterns; and cause, for a first port from among the respective ports, a first validated pattern to be loaded to a TDM storage resource included in the shared resources, the first validated pattern to facilitate processing packet data received or sent through the first port during a first time slot from among the repeating sequence of time slots, the first time slot allocated to the first port for use of the shared resources.

2. The apparatus of claim 1, comprising the TDM allocation information to further indicate a size of individual time slots in relation to the time period for the repeating sequence of time slots, which respective ports from among the ports of the network interface are assigned to the individual time slots, or identify the TDM storage resource included in the shared resources.

3. The apparatus of claim 1, the use of the shared resources to process packet data comprises to use the shared resources to process packet data at a media access control (MAC) module of the network interface.

4. The apparatus of claim 3, the first validated pattern comprises a pattern that indicates a count of chunks of data that are processed at the MAC module for the packet data received or sent through the first port before a tail or end of packet is detected.

5. The apparatus of claim 1, the TDM storage resource comprises static random access memory (SRAM), a plurality of latches, or a combination of latches and SRAM.

6. The apparatus of claim 1, further comprising the circuitry to:

cause, for a second port from among the respective ports, a second validated pattern to be loaded to the TDM storage resource, the second validated pattern to facilitate processing packet data received or sent through the second port during a second time slot from among the repeating sequence of time slots, the second time slot allocated to the second port for use of the shared resources; and cause, for a third port from among the respective ports, a third validated pattern to be loaded to the TDM storage resource, the third validated pattern to facilitate processing packet data received or sent through the third port during a third time slot from among the repeating sequence of time slots, the third time slot allocated to the third port for use of the shared resources.

7. The apparatus of claim 6, further comprising:

the first port capable of coupling with a first transmission medium having a first data bandwidth; and the second and third ports capable of coupling with a second transmission medium having a second data bandwidth, wherein the first data bandwidth is two times greater than the second data bandwidth, the first port allocated a half of a total number of the repeating sequence of time slots, the second and third ports separately allocated a fourth of the total number of the repeating sequence of time slots.

8. The apparatus of claim 1, the network interface comprising a network interface controller (NIC).

9. The apparatus of claim 1, further comprising:

one or more registers; and the circuitry to obtain the TDM allocation information from the one or more registers.

10. A method comprising:

obtaining time division multiplexing (TDM) allocation information that indicates a time period for a repeating sequence of time slots for use of shared resources to process packet data received or sent through ports of a network interface;

detecting separate patterns associated with receiving or sending data through respective ports from among the ports of the network interface;

verifying that the separate patterns repeat to validate the separate patterns; and loading, for a first port from among the respective ports, a first validated pattern to a TDM storage resource included in the shared resources, the first validated pattern to facilitate processing packet data received or sent through the first port during a first time slot from among the repeating sequence of time slots, the first time slot allocated to the first port for use of the shared resources.

11. The method of claim 10, the network interface comprising a network interface controller (NIC), wherein obtaining the TDM allocation information includes obtaining the TDM allocation information from one or more registers accessible to the network interface.

12. The method of claim 10, comprising the TDM allocation information further indicating a size of individual time slots in relation to the time period for the repeating sequence of time slots, which respective ports from among the ports of the network interface are assigned to the individual time slots, or identify the TDM storage resource included in the shared resources.

13. The method of claim 10, the use of the shared resources to process packet data comprises to use the shared resources to process packet data at a media access control (MAC) module for the network interface.

14. The method of claim 13, the first validated pattern comprises a pattern that indicates a count of chunks of data that are processed at the MAC module for the packet data received or sent through the first port before a tail or end of packet is detected.

15. The method of claim 10, the TDM storage resource comprises static random access memory (SRAM), a plurality of latches, or a combination of latches and SRAM.

16. The method of claim 10, further comprising:

loading, for a second port from among the respective ports, a second validated pattern to the TDM storage resource, the second validated pattern to facilitate processing packet data received or sent through the second port during a second time slot from among the repeating sequence of time slots, the second time slot allocated to the second port for use of the shared resources; and loading, for a third port from among the respective ports, a third validated pattern to the TDM storage resource, the third validated pattern to facilitate processing packet data received or sent through the third port during a third time slot from among the repeating sequence of time slots, the third time slot allocated to the third port for use of the shared resources.

17. The method of claim 16, further comprising:

the first port capable of coupling with a first transmission medium having a first data bandwidth; and the second and third ports capable of coupling with a second transmission medium having a second data bandwidth, wherein the first data bandwidth is two times greater than the second data bandwidth, the first port allocated a half of a total number of the repeating sequence of time slots, the second and third ports separately allocated a fourth of the total number of the repeating sequence of time slots.

18. At least one non-transitory machine readable medium comprising a plurality of instructions that in response to being executed by a system, cause the system to:
- obtain time division multiplexing (TDM) allocation information that indicates a time period for a repeating sequence of time slots for use of shared resources to process packet data received or sent through ports from among the ports of a network interface;
- detect separate patterns associated with receiving or sending data through respective ports of the network interface;
- verify that the separate patterns repeat to validate the separate patterns; and
- load, for a first port from among the respective ports, a first validated pattern to a TDM storage resource included in the shared resources, the first validated pattern to facilitate processing packet data received or sent through the first port during a first time slot from among the repeating sequence of time slots, the first time slot allocated to the first port for use of the shared resources.

19. The at least one non-transitory machine readable medium of claim 18, obtaining the TDM allocation information comprises obtaining the TDM allocation information from one or more registers accessible to the network interface.

20. The at least one non-transitory machine readable medium of claim 18, comprising the TDM allocation information further indicating a size of individual time slots in relation to the time period for the repeating sequence of time slots, which respective ports from among the ports of the network interface are assigned to the individual time slots, or identify the TDM storage resource included in the shared resources.

21. The at least one non-transitory machine readable medium of claim 18, the use of the shared resources to process packet data comprises to use the shared resources to process packet data at a media access control (MAC) module for the network interface.

22. The at least one non-transitory machine readable medium of claim 21, the first validated pattern comprises a pattern that indicates a count of chunks of data that are processed at the MAC module for the packet data received or sent through the first port before a tail or end of packet is detected.

23. The at least one non-transitory machine readable medium of claim 18, the TDM storage resource comprises static random access memory (SRAM), a plurality of latches, or a combination of latches and SRAM.

24. The at least one non-transitory machine readable medium of claim 18, further comprising the instructions to cause the system to:
- load, for a second port from among the respective ports, a second validated pattern to the TDM storage resource, the second validated pattern to facilitate processing packet data received or sent through the second port during a second time slot from among the repeating sequence of time slots, the second time slot allocated to the second port for use of the shared resources; and
- load, for a third port from among the respective ports, a third validated pattern to the TDM storage resource, the third validated pattern to facilitate processing packet data received or sent through the third port during a third time slot from among the repeating sequence of time slots, the third time slot allocated to the third port for use of the shared resources.

25. The at least one non-transitory machine readable medium of claim 24, further comprising:
- the first port capable of coupling with a first transmission medium having a first data bandwidth; and
- the second and third ports capable of coupling with a second transmission medium having a second data bandwidth, wherein the first data bandwidth is two times greater than the second data bandwidth, the first port allocated a half of a total number of the repeating sequence of time slots, the second and third ports separately allocated a fourth of the total number of the repeating sequence of time slots.

26. An apparatus comprising:
circuitry at a media access control (MAC) of a network interface controller, the circuitry to:
- obtain time division multiplexing (TDM) allocation information, the TDM allocation information to indicate a time period for a repeating sequence of time slots for use of shared resources of the MAC to process packet data received or sent through respective ports from among ports of the network interface controller, the shared resources to include memory to at least temporarily store packet data received through the respective ports;
- dynamically determine time slots to separately allocate to the respective ports to use the shared resources that includes the memory to process packet data based on time slot use patterns for the respective ports, the respective ports to have access to the shared resources; and
- allocate time slots to the respective ports based on the dynamic determination.

27. The apparatus of claim 26, comprising the TDM allocation information to further indicate a size of individual time slots in relation to the time period for the repeating sequence of time slots, which ports from among the respective ports are assigned to the individual time slots, or identify a portion of the memory included in the shared resources, wherein the identified portion of the memory is a TDM storage resource.

28. The apparatus of claim 26, further comprising:
one or more registers; and
the circuitry to obtain the TDM allocation information from the one or more registers.

29. The apparatus of claim 25, the memory comprising a TDM storage resource that includes flip-flop circuitry, latch circuitry, or static random access memory.

* * * * *